United States Patent
Eto

(10) Patent No.: US 11,838,187 B2
(45) Date of Patent: Dec. 5, 2023

(54) DISPLAY ICONS FOR COMMUNICATION DEVICES SUCH THAT DISPLAY TOPOLOGY COMPLEXITY IS LESS THAN A THRESHOLD

(71) Applicant: NEC Corporation, Tokyo (JP)

(72) Inventor: Masaru Eto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 170 days.

(21) Appl. No.: 17/464,852

(22) Filed: Sep. 2, 2021

(65) Prior Publication Data

US 2022/0078088 A1    Mar. 10, 2022

(30) Foreign Application Priority Data

Sep. 8, 2020   (JP) ................. 2020-150274

(51) Int. Cl.
   *H04L 41/12*    (2022.01)
   *H04L 41/22*    (2022.01)
   *H04L 41/14*    (2022.01)

(52) U.S. Cl.
   CPC .............. *H04L 41/22* (2013.01); *H04L 41/12* (2013.01); *H04L 41/14* (2013.01)

(58) Field of Classification Search
   CPC ........................................................ H04L 41/12
   See application file for complete search history.

(56) References Cited

U.S. PATENT DOCUMENTS

| | | | |
|---|---|---|---|
| 7,024,419 B1 * | 4/2006 | Klenk | H04L 41/22 707/999.102 |
| 2004/0150644 A1 * | 8/2004 | Kincaid | G06F 3/0481 345/440 |
| 2010/0060642 A1 * | 3/2010 | Chhaparwal | G06T 11/206 345/440 |

FOREIGN PATENT DOCUMENTS

JP      2014-219870 A    11/2014

OTHER PUBLICATIONS

R. Ishida, S. Takahashi and H. -Y. Wu, "Interactively Uncluttering Node Overlaps for Network Visualization," 2015 19th International Conference on Information Visualisation, 2015, pp. 200-205, doi: 10.1109/iV.2015.44. https://ieeexplore.ieee.org/abstract/document/7272602/, retrieved Dec. 6, 2022 (Year: 2015).*

C. Vehlow, T. Reinhardt and D. Weiskopf, "Visualizing Fuzzy Overlapping Communities in Networks," in IEEE Transactions on Visualization and Computer Graphics, vol. 19, No. 12, pp. 2486-2495, Dec. 2013, doi: 10.1109/TVCG.2013.232. https://ieeexplore.ieee.org/abstract/document/6634179 ,retrieved Dec. 7, 2022 (Year: 2013).*

* cited by examiner

*Primary Examiner* — Tom Y Chang

(57) ABSTRACT

A communication management system includes a display calculation unit configured to calculate, for each of a plurality of communication devices on a network, a display position of an icon that identifies the communication device in a display unit, based on positional information about the communication device. Further, the communication management system includes a complexity calculation unit configured to calculate complexity of a topology between a plurality of the icons, based on a display position of the plurality of icons. The display calculation unit corrects a display position of at least one of the icons when the complexity is equal to or more than a predetermined complexity threshold value.

9 Claims, 13 Drawing Sheets

DISPLAY ICONS FOR COMMUNICATION DEVICES SUCH THAT DISPLAY TOPOLOGY COMPLEXITY IS LESS THAN A THRESHOLD

INCORPORATION BY REFERENCE

This application is based upon and claims the benefit of priority from Japanese patent application No. 2020-150274, filed on Sep. 8, 2020, the disclosure of which is incorporated herein in its entirety by reference.

TECHNICAL FIELD

The present disclosure relates to a communication management system, a communication system, and a communication management method.

BACKGROUND ART

In a network management system (NMS) for monitoring and managing a communication device, displaying a topology of a network in order to manage the network by a user has been known. As a method of displaying a topology, a method of arranging an icon that identifies a communication device, based on only a logical connection, has been known. For example, Japanese Unexamined Patent Application Publication No. 2014-219870 discloses a method of generating a topology figure that expresses each of object groups having logical subordination in a tree structure, based on a predetermined algorithm, in such a way that a user can easily recognize the object group.

However, there is a problem that it is difficult for a user to visually recognize a physical positional relationship between communication devices in the method described in Japanese Unexamined Patent Application Publication No. 2014-219870.

Thus, it is conceivable to arrange an icon on a map, based on global positioning system (GPS) information about a communication device. However, when a plurality of communication devices are installed in the same position on a map, such as in the same building and in the same tower, icons overlap each other on the map. When an arrangement is corrected by an existing layout algorithm in this case, the arrangement is greatly displaced from that in the GPS information, and there is a problem that positional information needed to manage a network is lost. Further, since an appropriate arrangement of an icon is changed by a form of a topology, there is a problem that an existing layout algorithm is hard to handle the situation.

SUMMARY

An example object of the present disclosure is to solve the above-described problems, and provide a communication management system, a communication system, and a communication management method in which a user is able to suitably visually recognize a physical positional relationship between communication devices on a network.

A communication management system according to one example aspect of the present disclosure includes at least one memory configured to store instructions, and at least one processor configured to execute the instructions to: calculate, for each of a plurality of communication devices on a network, a display position of an icon that identifies the communication device in a display unit, based on positional information about the communication device; calculate complexity of a topology between a plurality of the icons, based on a display position of the plurality of the icons; and correct a display position of at least one of the icons when the complexity is equal to or more than a predetermined complexity threshold value.

A communication system according to one example aspect of the present disclosure includes a plurality of communication devices connected to a network, and a communication management device configured to manage the plurality of communication devices. The communication management device includes at least one memory configured to store instructions, and at least one processor configured to execute the instructions to: calculate, for each of the plurality of communication devices, a display position of an icon that identifies the communication device in a display unit, based on positional information about the communication device; calculate complexity of a topology between a plurality of the icons, based on a display position of the plurality of the icons; and correct a display position of at least one of the icons when the complexity is equal to or more than a predetermined complexity threshold value.

A communication management method according to one example aspect of the present disclosure includes calculating, for each of a plurality of communication devices on a network, a display position of an icon that identifies the communication device in a display unit, based on positional information about the communication device, calculating complexity of a topology between a plurality of the icons, based on a display position of the plurality of the icons, and correcting a display position of at least one of the icons when the complexity is equal to or more than a predetermined complexity threshold value.

BRIEF DESCRIPTION OF DRAWINGS

The above and other aspects, features and advantages of the present disclosure will become more apparent from the following description of certain example embodiments when taken in conjunction with the accompanying drawings, in which.

EMBODIMENTS

The present disclosure will be described below with reference to example embodiments of the present disclosure, but the present disclosure in the claims is not limited to the example embodiments below. Further, all configurations described in the example embodiments are not necessarily essential as a means for solving the problem. For clarification of the description, the description and the drawings below are appropriately omitted and simplified. Note that, the same element is denoted by the same reference sign in each of the drawings.

First Example Embodiment

Figure 1:
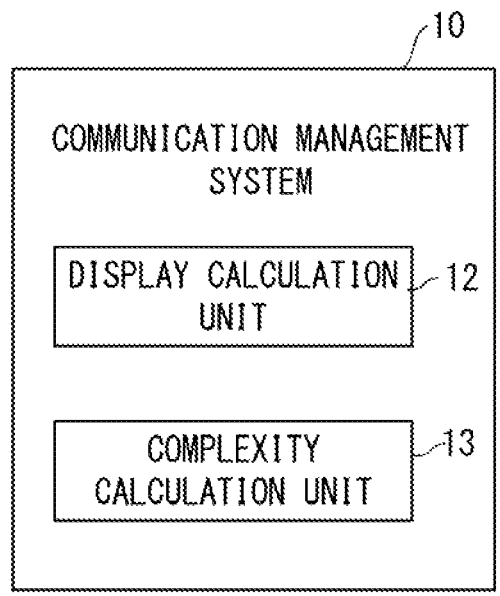
FIG. 1 is a block diagram illustrating a configuration of a communication management system according to a first example embodiment.

First, a first example embodiment according to the present disclosure will be described by using FIGS. 1 to 2. FIG. 1 is a block diagram illustrating a configuration of a communication management system 10 according to the first example embodiment. The communication management system 10 is a computer that displays a network topology on a display device. The communication management system 10 includes a display calculation unit 12 and a complexity calculation unit 13.

The display calculation unit 12 calculates, for each of a plurality of communication devices on a network, a display position of an icon that identifies the communication device in a display unit, based on positional information about the communication device. Further, when complexity calculated by the complexity calculation unit 13 described later is equal to or more than a predetermined complexity threshold value, the display calculation unit 12 corrects a display position of at least one of the icons.

The complexity calculation unit 13 calculates complexity of a topology between a plurality of icons, based on a display position of the plurality of icons being calculated by the display calculation unit 12.

Figure 2:
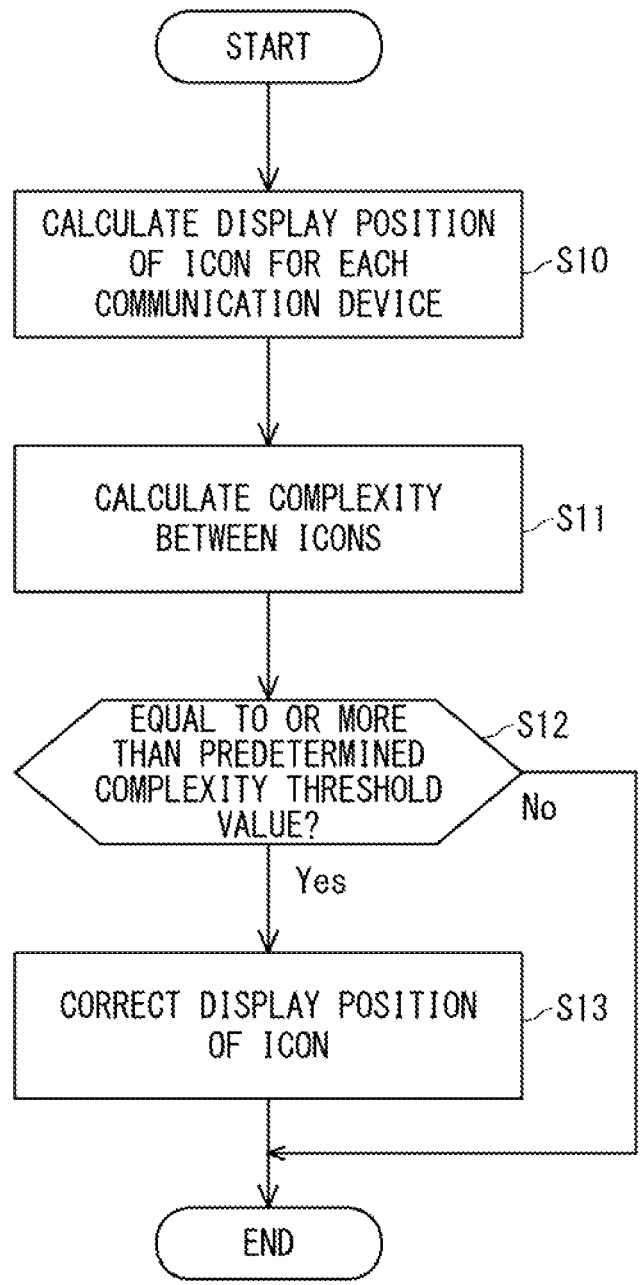
FIG. 2 is a flowchart illustrating a flow of processing of the communication management system according to the first example embodiment.

FIG. 2 is a flowchart illustrating a flow of processing of the communication management system 10 according to the first example embodiment.

First, in step S10, the display calculation unit 12 calculates, for each of a plurality of communication devices on a network, a display position of an icon that identifies the communication device in a display unit, based on positional information about the communication device. The display calculation unit 12 supplies information about a display position of a plurality of the icons to the complexity calculation unit 13.

Next, in step S11, the complexity calculation unit 13 calculates complexity of a topology between the plurality of icons, based on a display position of the plurality of icons.

The complexity calculation unit 13 supplies information about the complexity to the display calculation unit 12.

Next, in step S12, the display calculation unit 12 determines whether the complexity is equal to or more than a predetermined complexity threshold value. When the display calculation unit 12 determines that the complexity is equal to or more than the complexity threshold value (Yes in step S12), the display calculation unit 12 advances the processing to step S13. When the display calculation unit 12 determines that the complexity is not equal to or more than the complexity threshold value (No in step S12), the display calculation unit 12 ends the processing.

In step S13, the display calculation unit 12 corrects a display position of at least one of the icons, and ends the processing.

Note that, the determination processing in step S12 may be executed by the complexity calculation unit 13. In this case, the complexity calculation unit 13 notifies the display calculation unit 12 of a determination result.

In such a manner, according to the first example embodiment, the communication management system 10 calculates a display position of icons, based on positional information about communication devices, and corrects the display position in such a way that complexity is less than a threshold value. Therefore, the communication management system 10 can display, by icons, a physical positional relationship between the communication devices in a display manner that is easy to visually recognize. In this way, a user can suitably visually recognize a physical positional relationship between the communication devices on a network.

Second Example Embodiment

Figure 3:
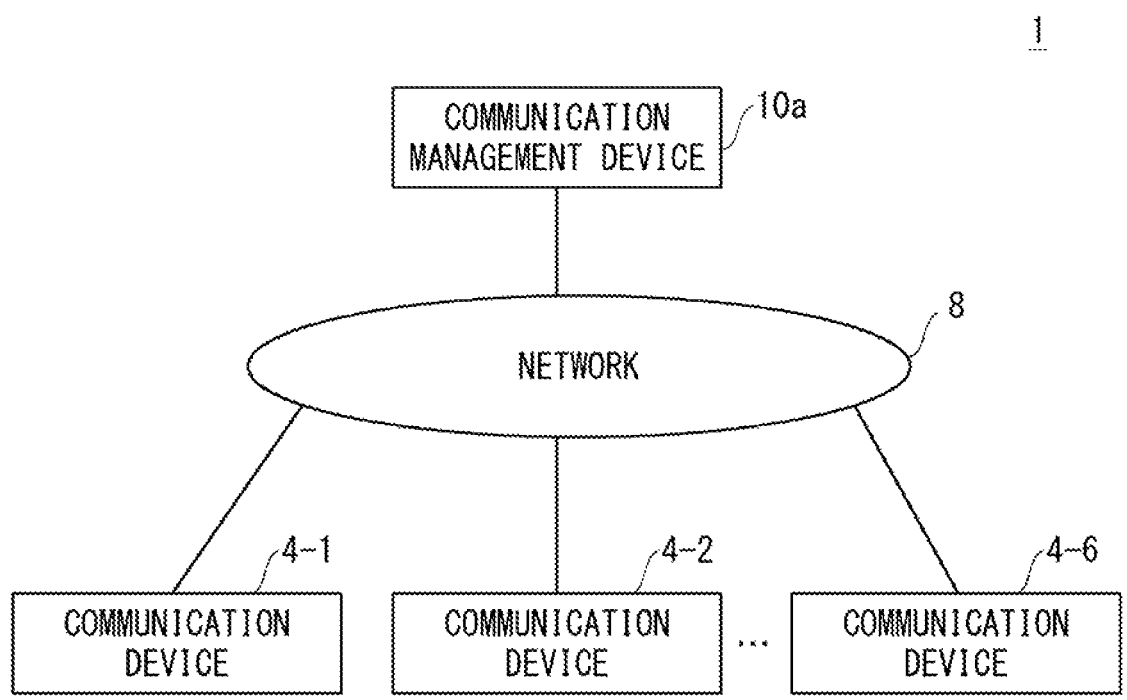
FIG. 3 is a diagram illustrating one example of a configuration of a communication system according to a second example embodiment.

Next, a second example embodiment according to the present disclosure will be described by using FIGS. 3 to 9. FIG. 3 is a diagram illustrating one example of a configuration of a communication system 1 according to the second example embodiment. The communication system 1 is a system that enables communication between communication devices connected onto a network 8. The communication system 1 includes a plurality of communication devices 4-1, 4-2, . . . and 4-6, and a communication management system (hereinafter referred to as a communication management device) 10*a*, and has a configuration in which the plurality of communication devices 4-1, 4-2, . . . and 4-6 and the communication management device 10*a* are communicably connected to one another via the network 8. When the communication devices 4-1, 4-2, . . . and 4-6 are mentioned without distinction below, the communication devices 4-1, 4-2, . . . and 4-6 are simply referred to as a communication device 4. Note that, the number of the communication devices 4 included in the communication system 1 is six in FIG. 3, but the number of the communication devices 4 may be less than six and may be more than six.

The communication device 4 is a computer that has a communication function and is connected to the network 8. The communication device 4 acquires and manages positional information about the communication device 4 itself, and transmits the positional information to the communication management device 10*a*. Note that, the positional information indicates physical positional information about a place where the device is located, and may be positional information based on GPS information or address information, for example.

The communication management device 10*a* is a computer, such as an NMS, that monitors and manages the plurality of communication devices 4. The communication management device 10a receives positional information from each of the communication devices 4, and displays a topology of the communication device 4 on a map, based on the positional information. In this way, a user of the communication management device 10a can recognize a positional relationship between the communication devices 4 with a single glance. Further, the communication management device 10a may include, in a displayed topology, identification information, a communication state, detected failure information, or the like of the communication device 4. In this way, a user of the communication management device 10a can recognize, together with a positional relationship, a state of the communication device 4 to be monitored, and can quickly handle a situation at occurrence of a failure and the like. Note that, the communication management device 10a is not limited to an NMS, and may be any other computer system that displays a topology of the communication device 4 on the network 8.

The network 8 is configured to include various networks such as the Internet, a wide area network (WAN), and a local area network, a dedicated line, or a combination thereof.

Figure 4:
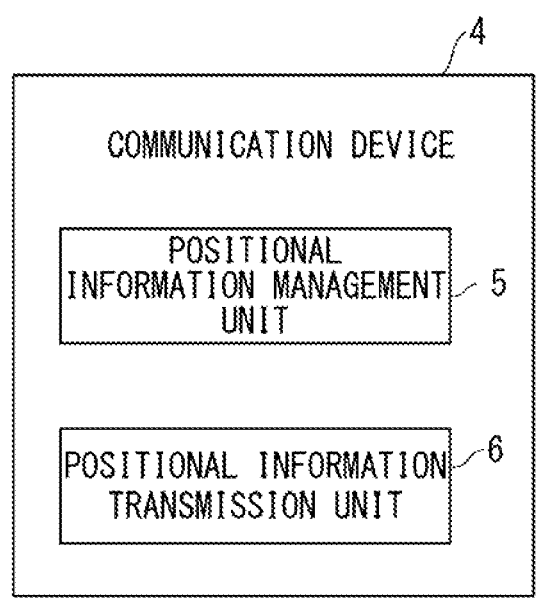
FIG. 4 is a block diagram illustrating one example of a configuration of a communication device according to the second example embodiment.

FIG. 4 is a block diagram illustrating one example of a configuration of the communication device 4 according to the second example embodiment. The communication device 4 includes a positional information management unit 5 and a positional information transmission unit 6.

The positional information management unit 5 sets positional information about the positional information management unit 5 itself, based on GPS information or previously registered address information, and manages the positional information.

The positional information transmission unit 6 transmits positional information managed by the positional information management unit 5 to the communication management device 10a. In this way, the communication management device 10a can acquire positional information about the communication device 4 on the network 8.

Figure 5:
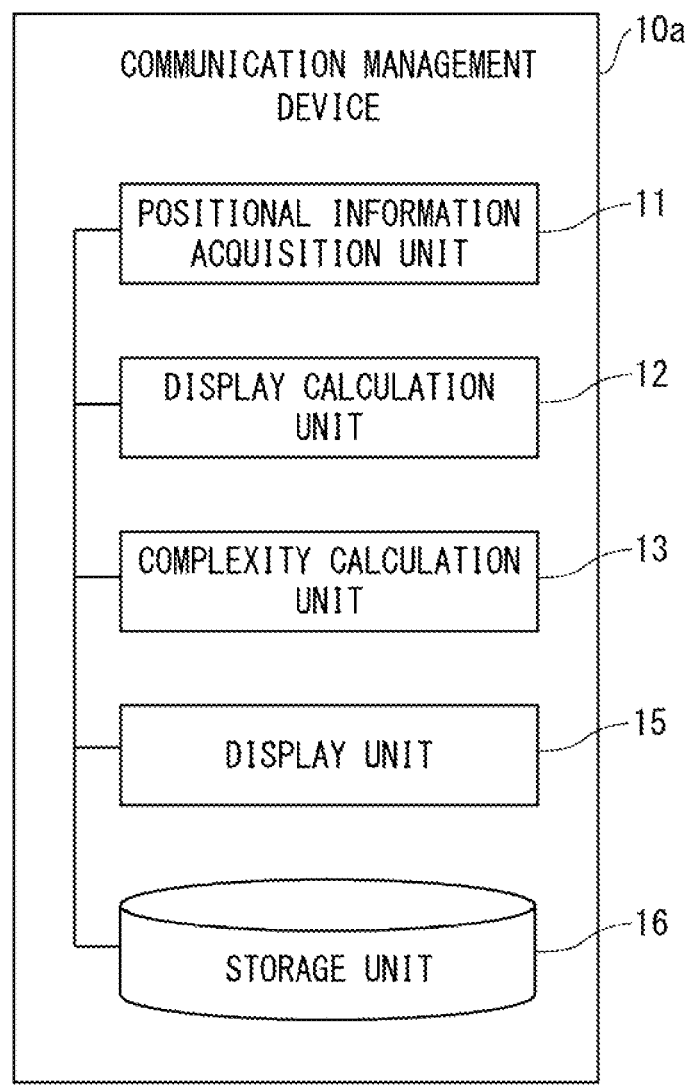
FIG. 5 is a block diagram illustrating one example of a configuration of a communication management device according to the second example embodiment.

FIG. 5 is a block diagram illustrating one example of a configuration of the communication management device 10a according to the second example embodiment. The communication management device 10a includes a positional information acquisition unit 11, a display calculation unit 12, a complexity calculation unit 13, a display unit 15, and a storage unit 16.

The positional information acquisition unit 11 receives and acquires positional information from each of the communication devices 4 on the network 8. In the second example embodiment, the positional information acquisition unit 11 acquires positional information about all of the communication devices 4 on the network 8, but may acquire positional information about only some of the communication devices 4. The positional information acquisition unit 11 supplies, to the display calculation unit 12, the acquired positional information in association with identification information about the communication device 4 being a transmission source. The identification information about the communication device 4 may be an internet protocol (IP) address or a media access control (MAC) address. Note that, the positional information acquisition unit 11 may store, in the storage unit 16, positional information associated with identification information about the communication device 4 being a transmission source.

The display calculation unit 12 calculates, for each of the communication devices 4, a display position of an icon in the display unit 15, based on positional information about the communication device 4. Herein, the icon is a diagram, a character string, a symbol, or an image that identifies the communication device 4. The icon may indicate information associated with identification information about the communication device 4. The information associated with the identification information may be identification information itself or a device type, or may be communication information or failure information about the communication device 4. Then, the display calculation unit 12 supplies information about the display position of the icon to the complexity calculation unit 13.

Further, the display calculation unit 12 determines whether to correct a display position of an icon, based on complexity calculated by the complexity calculation unit 13 described later. In the second example embodiment, the display calculation unit 12 determines whether complexity is equal to or more than a predetermined complexity threshold value, and, when the complexity is equal to or more than the complexity threshold value, the display calculation unit 12 corrects a display position of at least one of the icons. Then, the display calculation unit 12 supplies, to the display unit 15, a display position of an icon determined that correction is unnecessary.

The complexity calculation unit 13 calculates, based on a display position of a plurality of icons being calculated by the display calculation unit 12, complexity of a topology formed by the plurality of icons. The complexity is calculated based on at least one of the number of overlapping between a plurality of icons, the number of overlapping between edges that couple icons of the communication devices 4 having a connection relationship with each other, and the number of crossing between a plurality of icons and edges. The complexity calculation unit 13 supplies information about the calculated complexity to the display calculation unit 12.

The display unit 15 is a display device, such as a display, that displays an icon, based on information about a display position of the icon being supplied from the display calculation unit 12.

The storage unit 16 is a storage medium that stores various types of information needed for processing of the communication management device 10a. Note that, the storage unit 16 may store map information for generating a map.

Figure 6:
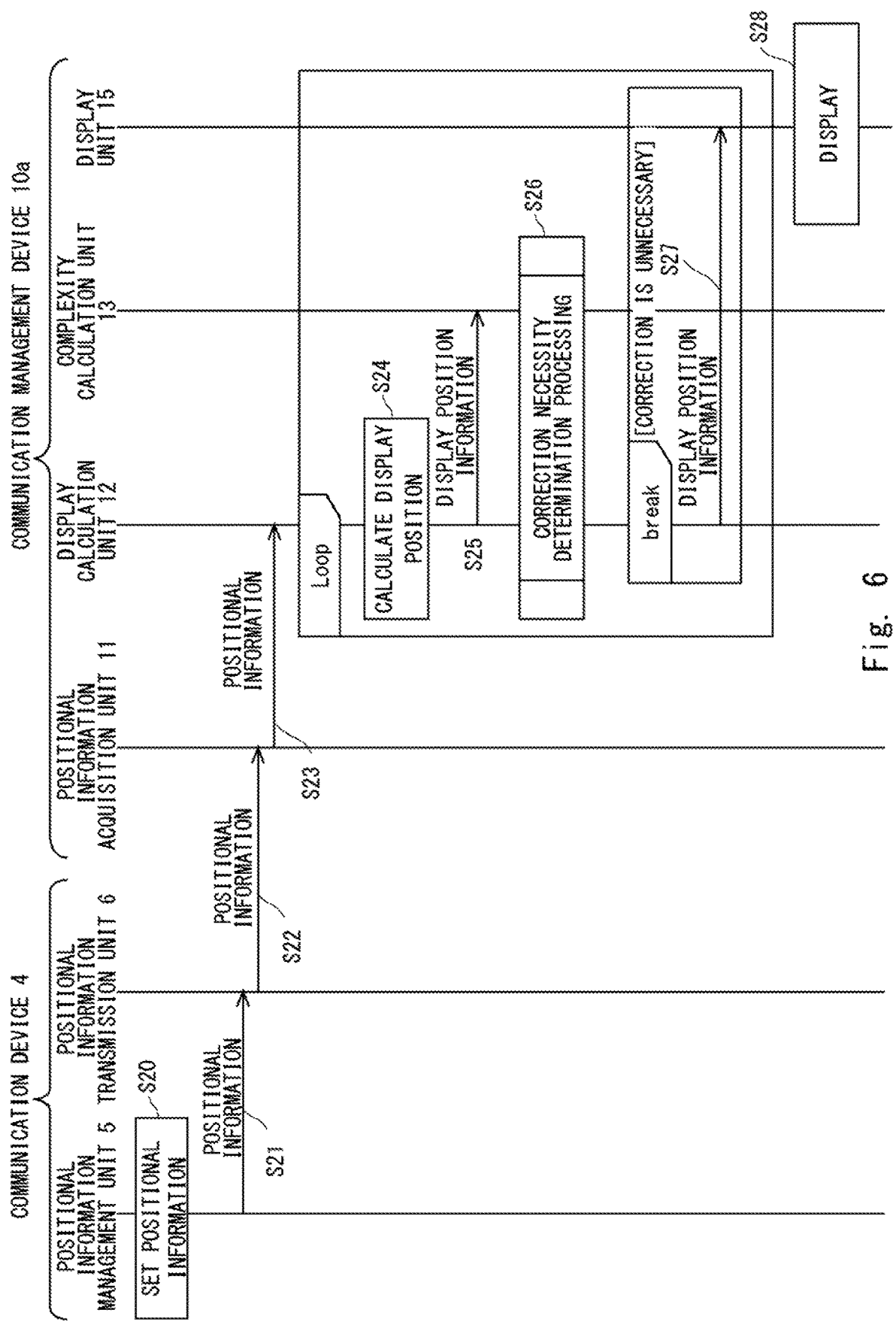
FIG. 6 is a sequence diagram illustrating one example of a flow of processing of the communication system according to the second example embodiment.

FIG. 6 is a sequence diagram illustrating one example of a flow of processing of the communication system 1 according to the second example embodiment.

First, in step S20, the positional information management unit 5 of the communication device 4 sets positional information about the communication device 4 itself from GPS information, address information, or the like.

Next, in step S21, the positional information management unit 5 supplies the positional information to the positional information transmission unit 6 of the communication device 4.

Next, in step S22, the positional information transmission unit 6 transmits the positional information to the positional information acquisition unit 11 of the communication management device 10a. All of the communication devices 4 on the network 8 execute the processing indicated in steps S20 to S22, and thus the positional information acquisition unit 11 acquires positional information and identification information about all of the communication devices 4 on the network 8. At this time, the positional information acquisition unit 11 may store, in the storage unit 16, the acquired positional information and the acquired identification information.

Next, in step S23, the positional information acquisition unit 11 supplies, to the display calculation unit 12 of the communication management device 10*a*, the acquired positional information and the acquired identification information about the communication devices 4. Note that, instead of this, the display calculation unit 12 may acquire the pieces of information described above from the storage unit 16.

Next, in step S24, the display calculation unit 12 calculates a display position of an icon for each of the communication devices 4. At this time, the display calculation unit 12 calculates a display position of an icon that identifies the communication device 4 in such a way that a distance between a position associated with the positional information about the communication device 4 in the display unit 15 and the display position of the icon is less than a predetermined distance threshold value. Herein, the position associated with the positional information about the communication device 4 in the display unit 15 indicates a position when an installation position of the communication device 4 is projected onto a display screen of the display unit 15. By imposing a restriction on a distance in such a manner, a display position being greatly displaced from an installation position of the communication device 4 can be avoided. Note that, in an initial calculation, the display calculation unit 12 may calculate, as a display position, a position associated with positional information in the display unit 15. In other words, a relative position between the communication devices 4 may correspond to a relative position of installation positions between the communication devices 4.

Next, in step S25, the display calculation unit 12 supplies, to the complexity calculation unit 13 of the communication management device 10*a*, information about the calculated display position.

Next, in step S26, the display calculation unit 12 and the complexity calculation unit 13 execute correction necessity determination processing described later.

The display calculation unit 12 and the complexity calculation unit 13 repeat the processing indicated in the steps S24 to S26 described above until correction of a display position of an icon, for all of the communication devices 4, is determined to be unnecessary. Note that, correction of a display position in the second example embodiment is referred to as local correction. The local correction indicates correction of a display position of an icon of one or a plurality of specific communication devices 4. For example, the display calculation unit 12 specifies the communication device 4 to be corrected, provides predetermined displacement to a display position of an icon of the specified communication device 4, and thus corrects the display position of the icon of the communication device 4.

Then, in step S27, when correction is determined to be unnecessary, the display calculation unit 12 confirms a display position of icons of all of the communication devices 4, and supplies, to the display unit 15, the display position of the icon of each of the communication devices 4. In addition, by using identification information about the communication device 4, the display calculation unit 12 acquires, from the storage unit 16, icon data including information associated with the identification information, and supplies the acquired icon data to the display unit 15.

Next, in step S28, the display unit 15 displays the icon of each of the communication devices 4 at the display position of the icon of the communication device 4.

Figure 7:
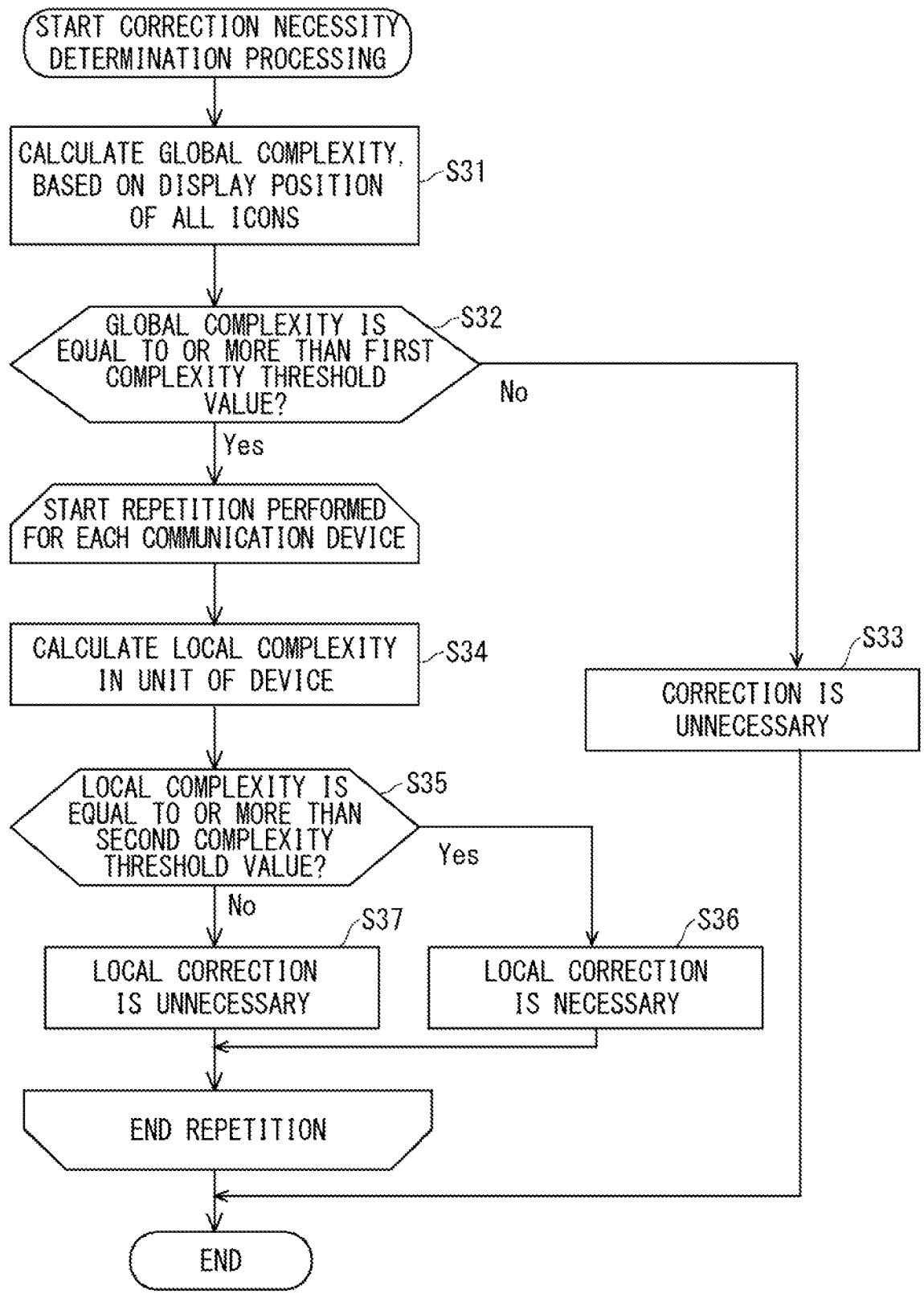
FIG. 7 is a flowchart illustrating one example of a flow of correction necessity determination processing of the communication management device according to the second example embodiment.

FIG. 7 is a flowchart illustrating one example of a flow of the correction necessity determination processing (the processing indicated in the step S26 in FIG. 6) of the communication management device 10*a* according to the second example embodiment.

First, in step S31, the complexity calculation unit 13 of the communication management device 10*a* calculates global complexity, based on a display position of icons of all of the communication devices 4 on the network 8. Herein, the global complexity indicates complexity of a topology in a unit of network. The complexity calculation unit 13 supplies information about the global complexity to the display calculation unit 12.

Next, in step S32, the display calculation unit 12 determines whether the global complexity is equal to or more than a predetermined first complexity threshold value. In this way, the display calculation unit 12 determines whether to correct a display position of an icon of any of the communication devices 4 on the network 8, based on the global complexity. When the global complexity is less than the first complexity threshold value (No in step S32), the display calculation unit 12 confirms the position as a display position, then sets correction of the position to be unnecessary (step S33), and advances the processing to the step S27 illustrated in FIG. 6. On the other hand, when the global complexity is equal to or more than the first complexity threshold value (Yes in step S32), the processing indicated in steps S34 to S37 is repeatedly executed for each of the communication devices 4.

In step S34, the complexity calculation unit 13 calculates local complexity, based on a display position of an icon that identifies the communication device 4 being a local correction necessity determination target, and one or more other icons. The local complexity indicates complexity of a topology formed between an icon that identifies the communication device 4 being a local correction necessity determination target, and one or more other icons. In other words, the local complexity is complexity of a topology in a unit of device. The complexity calculation unit 13 supplies information about the calculated local complexity to the display calculation unit 12.

Next, in step S35, the display calculation unit 12 determines whether the local complexity is equal to or more than a predetermined second complexity threshold value. The second complexity threshold value may be equal to or different from the first complexity threshold value. In this way, the display calculation unit 12 determines, based on the local complexity, whether to correct the display position of the icon that identifies the communication device 4 being a local correction necessity determination target. When the local complexity is equal to or more than the predetermined second complexity threshold value (Yes in step S35), the display calculation unit 12 advances the processing to step S36. When the local complexity is not equal to or more than the predetermined second complexity threshold value (No in step S35), the display calculation unit 12 advances the processing to step S37.

In step S36, the display calculation unit 12 determines that local correction of the display position of the icon of the communication device 4 being a local correction necessity determination target is necessary. Then, the display calculation unit 12 advances the processing to the step S34 for a next local correction necessity determination target. Note that, when the local correction necessity determination is performed for all of the communication devices 4, and correction is then determined to be necessary for any of the communication devices 4, the display calculation unit 12 returns the processing to the step S24 in FIG. 6. Herein, in the step S24 in FIG. 6, the communication device 4 to be corrected is a communication device 4 that requires the local correction, but, in addition to this, may also be a communication device 4 around the communication device 4 that requires the local correction. Note that, when the local correction is not determined to be unnecessary for all of the communication devices 4 even after the loop is repeated a predetermined number of times, the display calculation unit 12 may confirm, as a display position, a position when a statistic such as an average value of local complexity is minimum, and then consider the local correction to be unnecessary.

In step S37, the display calculation unit 12 determines that the local correction of the display position of the icon of the communication device 4 being a local correction necessity determination target is unnecessary. Then, the display calculation unit 12 may store, in the storage unit 16, the confirmed display position together with the identification information about the communication device 4, and advance the processing to the step S34 in a next local correction necessity determination target. When a determination result that the local correction is unnecessary for all of the communication devices 4 is acquired, the display calculation unit 12 advances the processing to the step S27 in FIG. 6.

In such a manner, the display calculation unit 12 first performs screening whether correction of a display position is necessary, based on global complexity in a unit of network. Therefore, whether to individually correct a display position of an icon can be determined in an early stage, and processing time can be shortened. Further, the display calculation unit 12 determines the communication device 4 to be corrected, based on local complexity in a unit of the communication device 4. Therefore, the display calculation unit 12 may correct only the communication device 4 to be corrected, and can thus efficiently correct a display position.

Note that, in the second example embodiment, when the local correction necessity determination is performed on all of the communication devices 4, and correction is then determined to be necessary for any of the communication devices 4, it is assumed that a display position is corrected in the steps S24 to S25 in FIG. 6, and the complexity calculation unit 13 advances the processing to the step S31 in FIG. 7. However, instead of this, every time the local correction is determined to be necessary for the communication device 4 in the step S36 in FIG. 7, individual local correction may be performed for the communication device 4. In this case, after the local correction, the complexity calculation unit 13 may advance the processing to the step S34 in which the same communication device 4 continues to be a determination target without passing through the steps S31 to S32 in FIG. 7. Note that, when the local correction for the communication device 4 becomes unnecessary, the display calculation unit 12 may advance the processing to the step S34 for a next local correction necessity determination target. Further, when the local correction is not determined to be unnecessary even after the local correction is repeated a predetermined number of times for the same communication device 4 as a correction target, the display calculation unit 12 may confirm, as a display position, a position in which a local complexity value is minimum. Then, the display calculation unit 12 may advance the processing to the step S34 for a next local correction necessity determination target. In this way, correction can be more efficiently performed.

Figure 8:
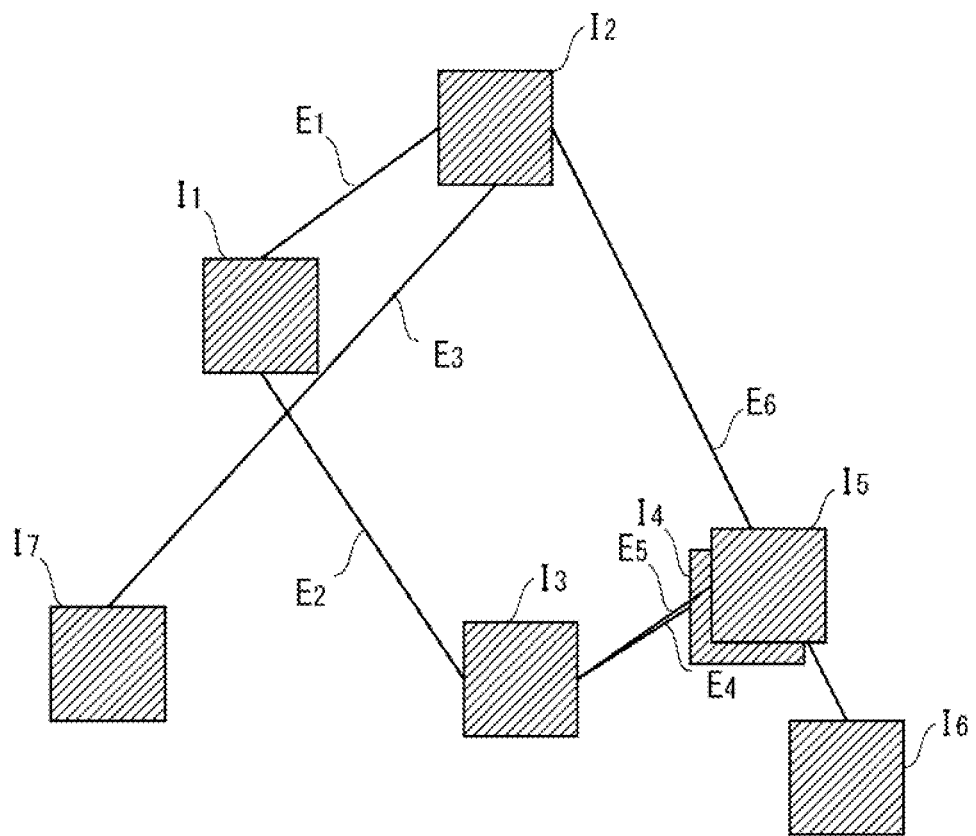
FIG. 8 is a diagram illustrating global complexity calculation processing according to the second example embodiment.

FIG. 8 is a diagram illustrating global complexity calculation processing according to the second example embodiment. FIG. 8 illustrates icons $I_1$ to $I_7$ of all of the communication devices 4-1 to 4-6 belonging to the network 8 when being displayed on the display unit 15, and edges $E_1$ to $E_6$ that couple the icons of the communication devices 4 having a connection relationship with each other.

Herein, global complexity is calculated with, as a target, the icons of all of the communication devices 4 belonging to the network 8. As one example, the global complexity is calculated as follows.

$$C_G = a1 \times c1 + a2 \times c2 + a3 \times c3$$

Herein, $C_G$ is the global complexity, and a1 is the number of overlapping between the icons, a2 is the number of crossing between the edges, and a3 is the number of overlapping between the icons and the edges. Further, c1, c2, and c3 are parameter coefficients determined for each parameter in association with parameters a1, a2, and a3, respectively. Note that, for the parameter, any other parameter that affects a topology may be used instead of or in addition to a1 to a3 described above. Further, the global complexity described above is a linear combination of a parameter and a parameter coefficient, which is not limited thereto.

As illustrated in FIG. 8, the icons $I_4$ and $I_5$ are displayed in such a way as to overlap each other when being displayed on the display unit 15 since the communication devices 4 associated with each of the icons $I_4$ and $I_5$ are installed in positions close to each other. Further, the edges $E_2$ and $E_3$ cross each other. Furthermore, the edge $E_5$ overlaps the icon $I_4$, and the edge $E_6$ overlaps the icons $I_4$ and $I_5$. Note that, c1, c2, and c3 are assumed to be all 1.

In this case, the global complexity $C_G$ is 5 (=1×1+1×1+3×1).

Figure 9:
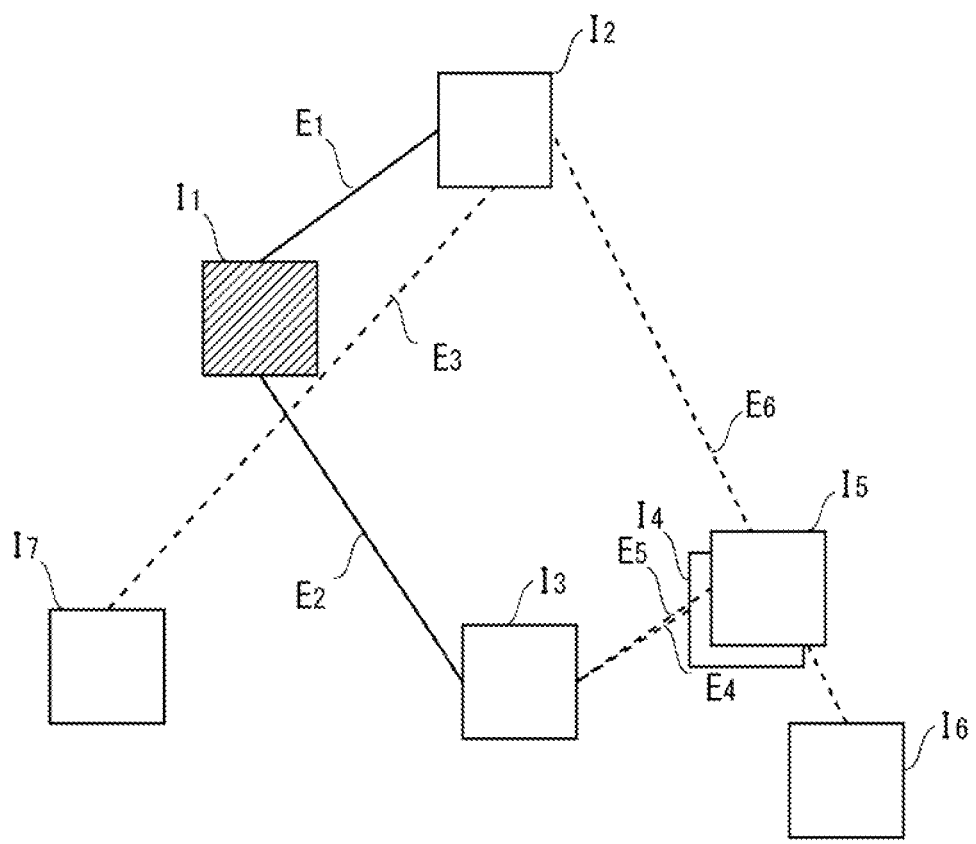
FIG. 9 is a diagram illustrating local complexity calculation processing according to the second example embodiment.

FIG. 9 is a diagram illustrating local complexity calculation processing according to the second example embodiment. Similarly to FIG. 8, FIG. 9 also illustrates icons $I_1$ to $I_7$ and edges $E_1$ to $E_6$. In FIG. 9, a local correction necessity determination target is the communication device 4-1, and only the icon $I_1$ of the communication device 4-1 as the communication device 4 of an interest in the calculation is indicated by an oblique line.

Herein, as one example, local complexity is calculated as follows.

$$C_L = a1' \times c1 + a2' \times c2 + a3' \times c3$$

Herein, $C_L$ is the local complexity, and a1' is the number of overlapping between the icon $I_1$ and the other icons $I_2$ to $I_7$. Further, a2' is the number of crossing between the edge that connects the icon $I_1$ and the icon of the communication device 4 having a connection relationship with the communication device 4-1, and the other edge, and a3' is the number of overlapping between the icon $I_1$ and the edges $E_1$ to $E_6$. Herein, a parameter and a definition equation of the local complexity is also not limited thereto.

As illustrated in FIG. 9, there is no icon that overlaps the icon $I_1$. Further, the edges $E_2$ and $E_3$ cross each other. Furthermore, there is no edge that overlaps the icon $I_1$.

In this case, the local complexity $C_L$ is 1 (=0×1+1×1+0×1).

Note that, an edge is defined as an edge that couples icons of the communication devices 4 having a connection relationship with each other, but instead of this, an edge may be an edge that couples icons of the communication devices 4 having a hierarchy relationship.

Herein, in a method of displaying only a logical connection of a communication device, it is conceivable for an arrangement of icons on a map to arrange adjacent icons to be close to each other, or look for empty space and arrange icons when the icons overlap each other. In this method, icons can be arranged in such a way that overlapping of the icons is minimum. However, not only positional information is not taken into consideration, but also a line connecting icons is not taken into consideration. Therefore, in this method, it may be hard for a user to visually recognize information about the communication devices 4.

Further, as an existing layout algorithm, ForceAtlas2 being an algorithm for graphing by a mechanical model has been known. By the algorithm, icons are adjusted in such a way as to be arranged at a regular interval. Note that, in order to optimally arrange icons by the algorithm, a user needs to manually adjust a parameter.

Further, as a technique for arranging an icon on a map, using a map application (for example, Google map) has been known. In the map application, a display of an icon is performed according to positional information. In the map application, when there are a plurality of pieces of information desired to be displayed in the same position, icons can converge into one, and different information can be displayed on a different display screen. Herein, as in the second example embodiment, when a topology of the communication devices 4 on the network 8 is displayed and the communication devices 4 are managed, which communication devices 4 have a connection relationship is important. Therefore, in the method of displaying different information on a different display screen, information needed for a user cannot be confirmed with a single glance. Note that, an algorithm such as ForceAtlas2 described above cannot be applied when an icon is arranged on a map since positional information about the communication device 4 is not taken into consideration.

On the other hand, according to the second example embodiment, the communication management device 10a calculates a display position of an icon, based on positional information about the communication device 4, and repeats correction of the display position until complexity becomes less than a threshold value. Therefore, the communication management device 10a can provide an appropriate arrangement of an icon regardless of a form of a topology of the network 8. Therefore, the communication management device 10a can display, based on a physical positional relationship between the communication devices 4, information needed to manage the communication device 4 in a display manner that is easy to visually recognize. In this way, a user can suitably visually recognize information about the communication device 4, based on a physical positional relationship between the communication devices 4 on the network 8.

Third Example Embodiment

Next, a third example embodiment according to the present disclosure will be described by using FIGS. 10 to 12. In the third example embodiment, a communication management device has a characteristic in updating a parameter coefficient.

Figure 10:
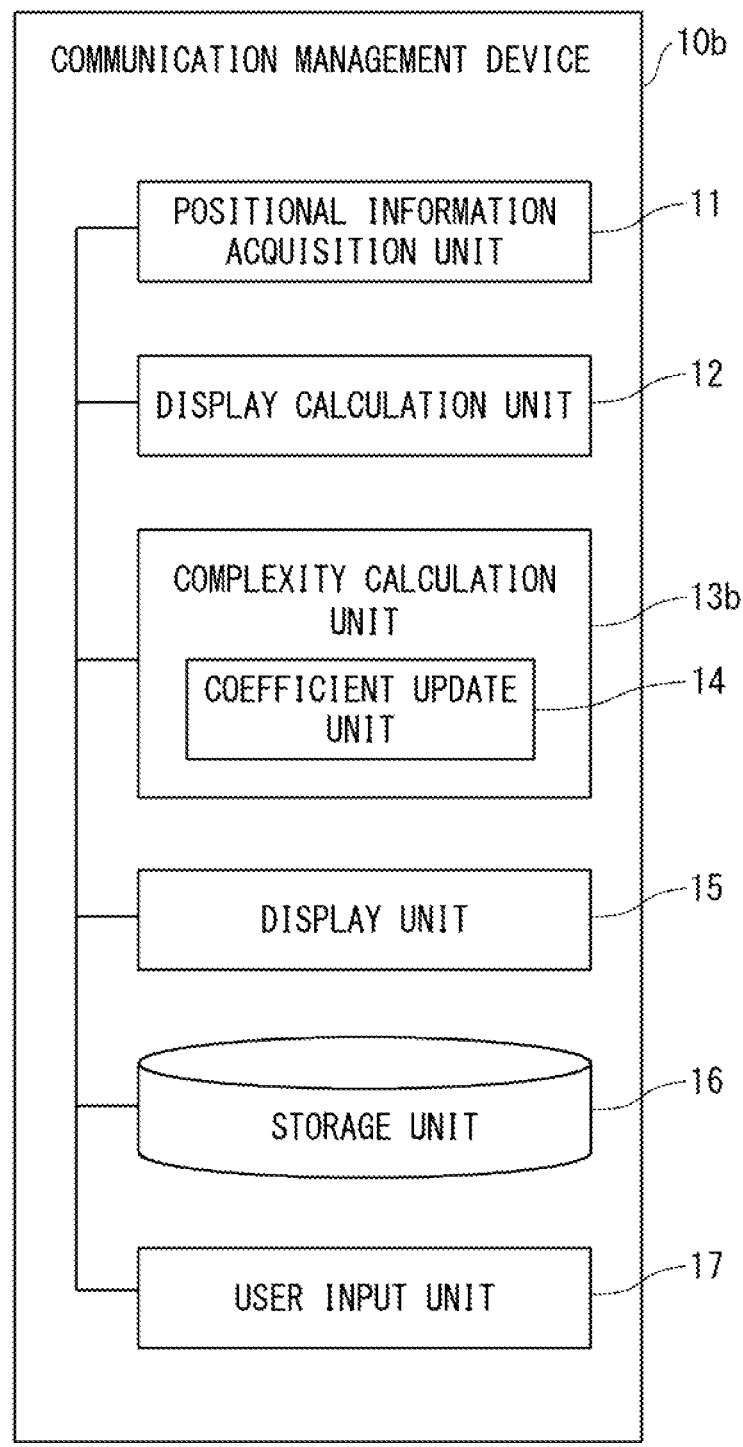
FIG. 10 is a block diagram illustrating one example of a configuration of a communication management device according to a third example embodiment.

FIG. 10 is a block diagram illustrating one example of a configuration of a communication management device 10b according to the third example embodiment. The communication management device 10b according to the third example embodiment is a computer having a basically similar configuration and a basically similar function to those of the communication management device 10a according to the second example embodiment. However, the communication management device 10b is different from the communication management device 10a in a point that the communication management device 10b includes a complexity calculation unit 13b and a user input unit 17, instead of the complexity calculation unit 13.

The complexity calculation unit 13b includes a coefficient update unit 14 in addition to the configuration and the function of the complexity calculation unit 13.

The coefficient update unit 14 updates, in response to an input of a display position of an icon by a user, a parameter coefficient, based on the display position related to the input.

The user input unit 17 is an input device that receives an input of a display position of an icon by a user. For example, the user input unit 17 supplies, in response to manual correction of a display position of an icon on a display unit 15 through a pointing device, a touch panel, or the like by a user, information about the corrected display position to the coefficient update unit 14.

Figure 11:
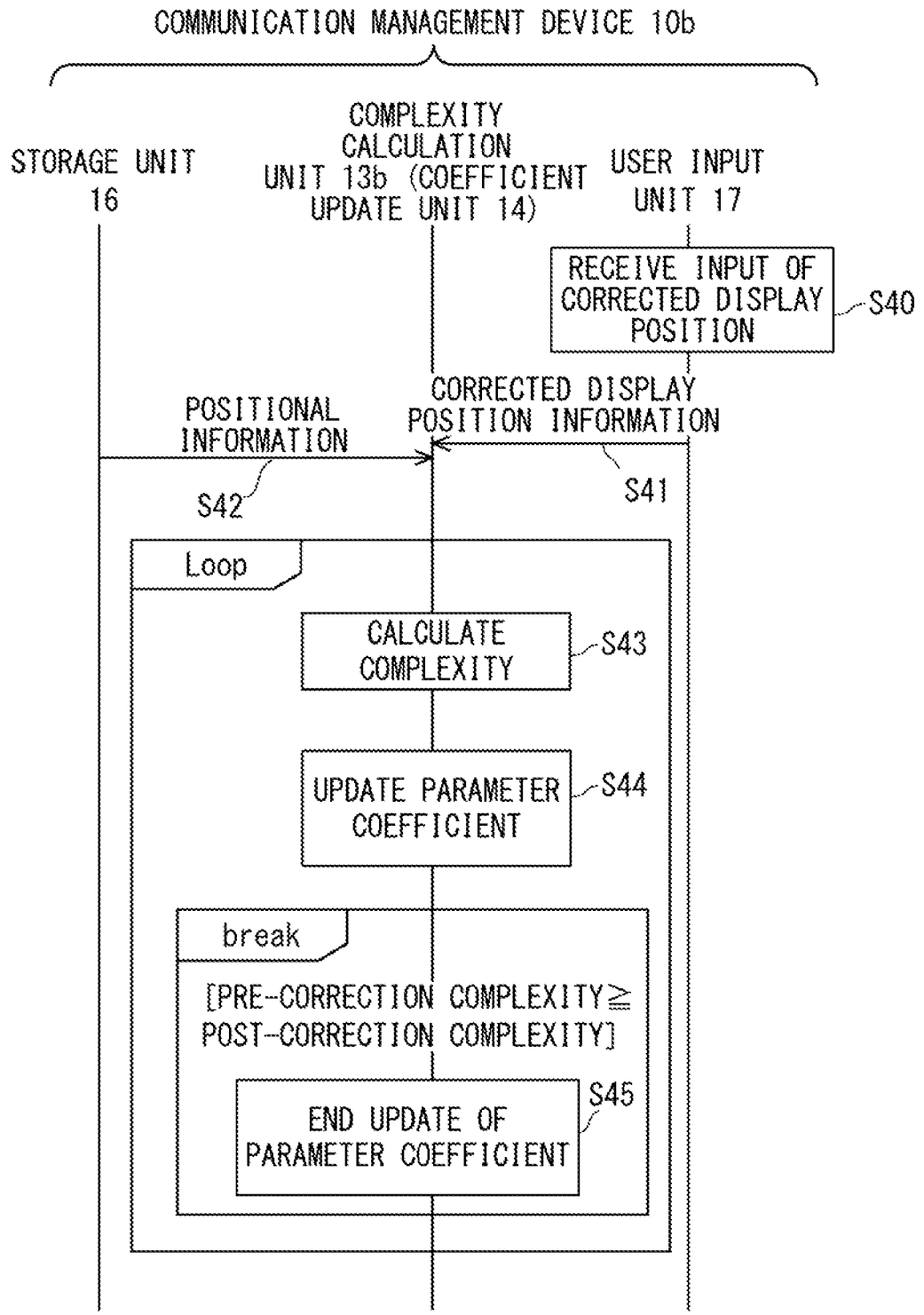
FIG. 11 is a sequence diagram illustrating one example of a flow of parameter coefficient update processing of the communication management device according to the third example embodiment.

FIG. 11 is a sequence diagram illustrating one example of a flow of parameter coefficient update processing of the communication management device 10b according to the third example embodiment. The parameter coefficient update processing may be executed subsequently to the step S28 in FIG. 6.

First, in step S40, the user input unit 17 of the communication management device 10b receives, in response to manual correction of a display position of an icon, corrected display position information being input information about the corrected display position.

Next, in step S41, the user input unit 17 supplies the corrected display position information to the coefficient update unit 14 of the complexity calculation unit 13b of the communication management device 10b. In this way, the coefficient update unit 14 acquires the corrected display position information.

Next, in step S42, the coefficient update unit 14 acquires positional information about a communication device 4 on a network 8 being stored in a storage unit 16 of the communication management device 10b. Note that, the coefficient update unit 14 may acquire the positional information from a positional information acquisition unit 11 instead of the storage unit 16.

Next, in step S43, the coefficient update unit 14 calculates complexity (referred to as pre-correction complexity) based on the positional information being acquired from the storage unit 16, and complexity (referred to as post-correction complexity) based on the corrected display position information being acquired from the user input unit 17. At this time, the complexity may be at least either one of local complexity and global complexity.

Next, in step S44, the coefficient update unit 14 updates a parameter coefficient used for calculating complexity. At this time, the coefficient update unit 14 updates the parameter coefficient when the post-correction complexity is greater than the pre-correction complexity.

An update of a parameter coefficient is performed by comparing pre-correction complexity and post-correction complexity. The coefficient update unit 14 reduces a value of a parameter coefficient when a value of post-correction complexity is greater than a value of pre-correction complexity, and increases a value of a parameter coefficient when a value of post-correction complexity is less than a value of pre-correction complexity.

For example, it is assumed that all of parameter coefficients c1, c2, and c3 are 1, and values of parameters a1, a2, and a3 are 10, 10, and 10, respectively, in a display position before correction. Then, it is assumed that, by manually correcting a map display position by a user, a1, a2, and a3 change to 15, 7, and 10, respectively.

In this case, pre-correction complexity $C_0$ is 30 (=10×1+ 10×1+10×1), and post-correction complexity $C_1$ is 32 (=15× 1+7×1+10×1).

Since the value a1 of the parameter is greater after the correction than before the correction, the coefficient update unit 14 reduces a value of the parameter coefficient c1 associated with a1. Since the value a2 of the parameter is smaller after the correction than before the correction, the coefficient update unit 14 increases a value of the parameter coefficient c2 associated with a2. For example, the coefficient update unit 14 updates the parameter coefficients c1, c2, and c3 to 0.7, 1.3, and 1.0, respectively. Note that, how much a parameter coefficient is changed may be determined based on an error before and after correction of complexity or an error before and after correction of a value of an associated parameter.

Then, the coefficient update unit 14 calculates the pre-correction complexity and the post-correction complexity again. In this case, the pre-correction complexity $C_0$ is 30 (=10×1+10×1+10×1), and the post-correction complexity $C_1$ is 29.6 (=15×0.7+7×1.3+10×1).

Note that, the coefficient update unit 14 repeats the steps S43 to S44 described above until the post-correction complexity becomes less than the pre-correction complexity.

In step S45, the coefficient update unit 14 confirms a parameter coefficient when the post-correction complexity becomes less than the pre-correction complexity, and ends the parameter coefficient update processing.

Figure 12:
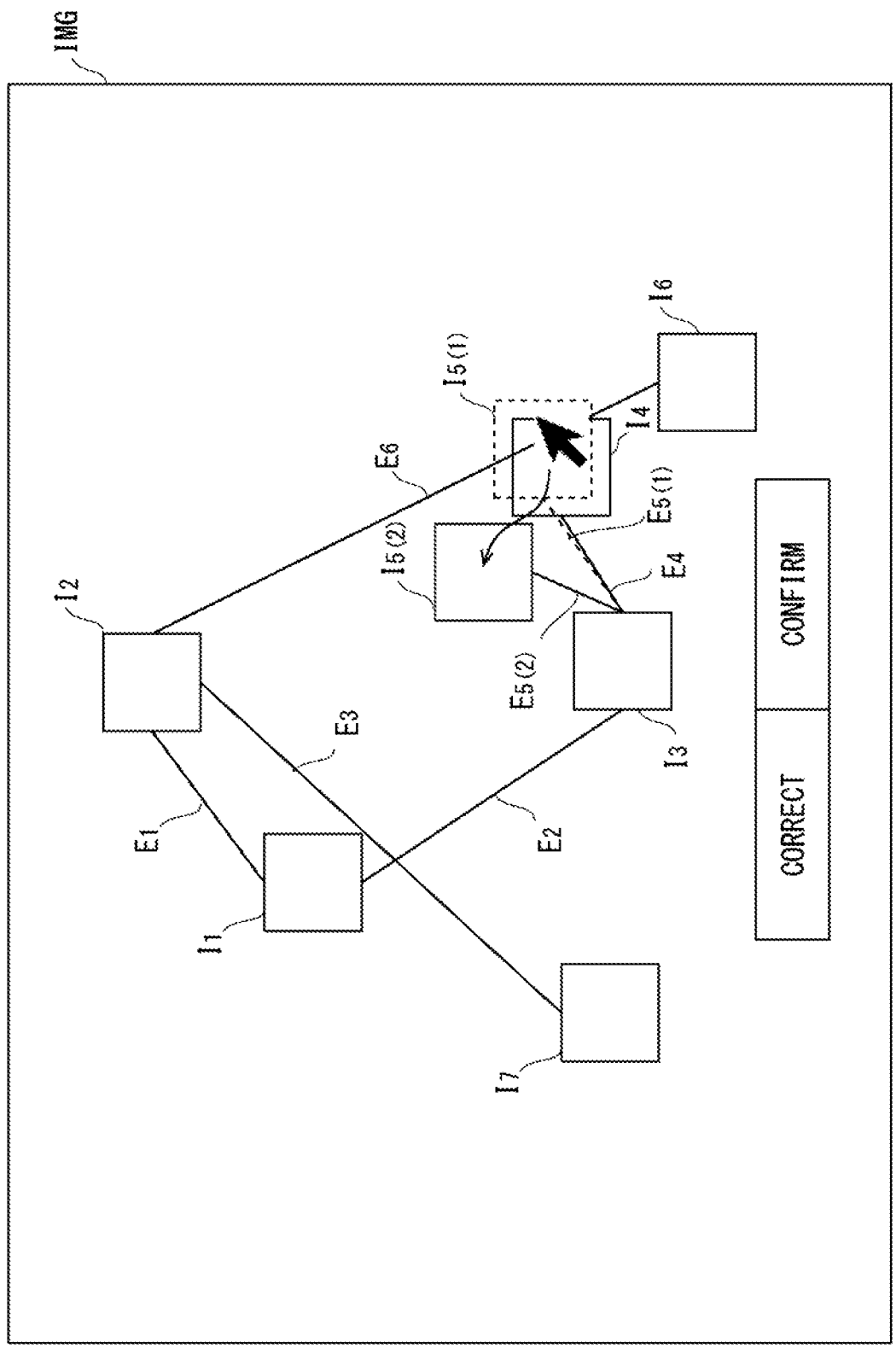
FIG. 12 is a diagram illustrating one example of a display of a display unit in the parameter coefficient update processing according to the third example embodiment.

FIG. 12 is a diagram illustrating one example of a display of the display unit 15 in the parameter coefficient update processing according to the third example embodiment. FIG. 12 illustrates a display image IMG of the display unit 15 in the processing indicated in the step S40 in FIG. 11. The display image IMG includes icons $I_1$ to $I_7$ arranged in a display position determined that correction is unnecessary by a display calculation unit 12, and edges $E_1$ to $E_6$. At this time, for example, the display unit 15 displays, on the display image IMG, a pointer being operable by a user and an input button indicates correct or confirm. A user clicks the input button indicating correct by using a pointing device such as a mouse, then selects a specific icon, and drags the icon to a preferred display position ($I_{5(1)} \rightarrow I_{5(2)}$). Note that, due to the movement correction of the icon, a position and a length of a related edge are corrected ($E_{5(1)} \rightarrow E_{5(2)}$). Then, the user ends a correction operation by clicking the input button indicating confirm.

In such a manner, according to the third example embodiment, the communication management device 10b updates a parameter coefficient used for a complexity calculation, based on a correction operation of a display position by a user, and can thus feed back, to processing subsequent to a next time, a correction result of the display position by a user. In this way, the communication management device 10b can display an icon in an optimum display position for each user according to a preference or a request of the user.

Further, the communication management device 10b according to the third example embodiment can also acquire an effect similar to that in the second example embodiment.

Note that, in the third example embodiment, the user input unit 17 receives correction of a display position of an icon. However, instead of or in addition to this, an input of a display manner such as a size or a shape of an icon or a thickness of an edge by a user may be received. At this time, the coefficient update unit 14 may compare complexity and update a parameter coefficient, based on information about a display manner before and after the correction instead of or in addition to information about a display position before and after the correction. In this way, the communication management device 10b can display an icon in an optimum design for each user according to a preference or a request of the user.

Although the present disclosure has been described above as a configuration of hardware in the example embodiments described above, the present disclosure is not limited to the example embodiments. The present disclosure can also achieve the processing described above by causing a processor to execute a computer program.

A computer in the example embodiments described above is formed of a computer system including a personal computer, a word processor, and the like. However, the present disclosure is not limited thereto, and the computer can also be formed of a server of a local area network (LAN), a host of computer (personal computer) communication, a computer system connected onto the Internet, and the like. Further, the computer can also be formed of the entire network by distributing a function to each apparatus on the network.

Figure 13:
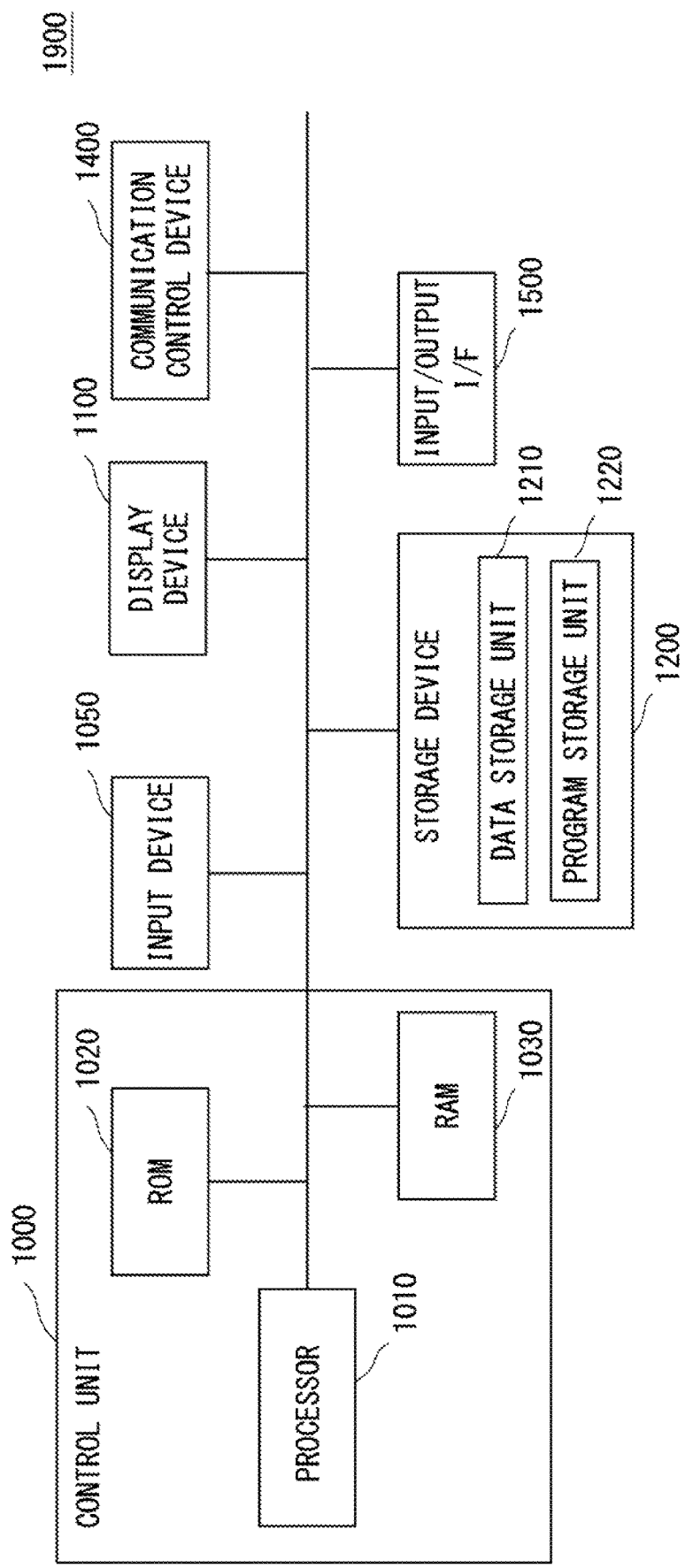
FIG. 13 is a schematic configuration diagram of a computer according to the first to third example embodiments.

FIG. 13 is a schematic configuration diagram of a computer 1900 according to the first to third example embodiments. As illustrated in FIG. 13, the computer 1900 includes a control unit 1000 for controlling the entire system. An input device 1050, a display device 1100, a storage device 1200, a communication control device 1400, and an input/output I/F 1500 are connected to the control unit 1000 via a bus line such as a data bus.

The control unit 1000 includes a processor 1010, a ROM 1020, and a RAM 1030.

The processor 1010 executes various types of information processing and control according to a program stored in various storage units such as the ROM 1020 and the storage device 1200. As the processor 1010, a central processing unit (CPU), a graphics processing unit (GPU), a field-programmable gate array (FPGA), a digital signal processor (DSP), an application specific integrated circuit (ASIC), and the like may be used. Further, a plurality among them may be used in parallel.

The ROM 1020 is a read-only memory that previously stores various programs and data causing the processor 1010 to perform various types of control and arithmetic operations.

The RAM 1030 is a random-access memory used as a working memory by the processor 1010. Various areas for executing various types of processing according to the first to third example embodiments can be secured in the RAM 1030.

The input device 1050 is an input device that receives an input from a user, such as a keyboard, a mouse, and a touch panel. For example, various keys such as a numeric key, a functional key for performing various functions, and a cursor key are arranged on a keyboard. A mouse is a pointing device, and is an input device that designates an associated function by clicking a key, an icon, and the like displayed on the display device 1100. A touch panel is an input apparatus arranged on a surface of the display device 1100, specifies a touch position of a user being associated with various operation keys displayed in a screen of the display device 1100, and receives an input of the operation key displayed in association with the touch position.

For example, a CRT, a liquid crystal display, or the like is used for the display device 1100. The display device 1100 displays an input result by a keyboard or a mouse, and displays searched image information in the end.

Further, the display device 1100 displays an image of an operation key for performing various necessary operations from a touch panel according to various functions of the computer 1900.

The storage device 1200 is formed of a storage medium that can perform reading and writing, and a driving device for reading and writing various types of information, such as a program and data, from and to the storage medium.

The storage device 1200 includes a data storage unit 1210, a program storage unit 1220, and the like. The program store unit 1220 stores a program that includes instructions (or software codes) that, when loaded into a computer, cause the computer to perform one or more of the functions described in the example embodiments. The data store unit 1210 stores various types of pieces of data of various databases according to the first to third example embodiments.

The storage medium used for the storage device 1200 may be a non-transitory computer-readable medium or a tangible storage medium. By way of example, and not a limitation, non-transitory computer-readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer-readable medium or a communication medium. By way of example, and not a limitation, transitory computer-readable media or communication media can include electrical, optical, acoustical, or other forms of propagated signals.

The communication control device 1400 is a control device for network-connecting the computer 1900 and various external electronic apparatuses such as another personal computer and another word processor. The communication control device 1400 can access the computer 1900 from various external electronic apparatuses.

The input/output I/F 1500 is an interface for connecting various input/output devices via a parallel port, a serial port, a keyboard port, a mouse port, or the like.

An execution order of each processing in the system and the method indicated in the claims, the specification, and the drawings is not particularly stated such as "before" and "prior to", and any order can be achieved as long as an output of previous processing is not used for subsequent processing. Even when "first", "next", or the like is used for the sake of convenience to describe an operation flow in the claims, the specification, and the drawings, it does not mean that execution in this order is essential.

While the disclosure has been particularly shown and described with reference to example embodiments thereof, the disclosure is not limited to these example embodiments. It will be understood by those of ordinary skill in the art that various changes in form and details may be made therein without departing from the spirit and scope of the present disclosure as defined by the claims.

Each of the above-described example embodiments can be combined as desirable by one of ordinary skill in the art.

An example advantage according to the above-described example embodiments is able to provide a communication management system, a communication system, and a communication management method in which a user is able to suitably visually recognize a physical positional relationship between communication devices on a network.

The whole or part of the example embodiments disclosed above can be described as, but not limited to, the following supplementary notes.

(Supplementary Note 1)

A communication management system including:
  a display calculation unit configured to calculate, for each of a plurality of communication devices on a network, a display position of an icon that identifies the communication device in a display unit, based on positional information about the communication device; and
  a complexity calculation unit configured to calculate complexity of a topology between a plurality of the icons, based on a display position of the plurality of the icons,
  wherein the display calculation unit corrects a display position of at least one of the icons when the complexity is equal to or more than a predetermined complexity threshold value.

(Supplementary Note 2)

The communication management system according to supplementary note 1, wherein the complexity calculation unit
  calculates the complexity by using a parameter coefficient determined for each parameter, and
  updates, in response to an input of a display position of the icon by a user, the parameter coefficient, based on the display position related to the input.

(Supplementary Note 3)

The communication management system according to supplementary note 1 or 2, wherein
  the complexity calculation unit calculates, for each of the plurality of communication devices, complexity of a topology formed between an icon that identifies the communication device and another icon, based on a display position of an icon that identifies the communication device and the another icon, and
  the display calculation unit determines whether to correct a display position of the icon that identifies the communication device, based on the complexity.

(Supplementary Note 4)

The communication management system according to supplementary note 3, wherein
  the complexity calculation unit calculates complexity of a topology in a unit of network, based on a display position of icons of all of the communication devices on the network, and
  the display calculation unit determines whether to correct a display position of an icon of any of the communication devices on the network, based on the complexity of the topology in the unit of network.

(Supplementary Note 5)

The communication management system according to any one of supplementary notes 1 to 4, wherein the complexity calculation unit calculates the complexity, based on at least one of the number of overlapping between the plurality of icons, the number of crossing between edges that couple the icons having a connection relationship with each other, and the number of overlapping between the plurality of icons and edges.

(Supplementary Note 6)

The communication management system according to any one of supplementary notes 1 to 5, wherein the display calculation unit calculates a display position of an icon that identifies the communication device in such a way that a distance between a position associated with positional information about the communication device in the display unit and a display position of the icon is less than a predetermined distance threshold value.

(Supplementary Note 7)

A communication system including:
a plurality of communication devices connected to a network; and
a communication management device configured to manage the plurality of communication devices,
wherein the communication management device includes
a display calculation unit configured to calculate, for each of the plurality of communication devices, a display position of an icon that identifies the communication device in a display unit, based on positional information about the communication device, and
a complexity calculation unit configured to calculate complexity of a topology between a plurality of the icons, based on a display position of the plurality of the icons, and
the display calculation unit corrects a display position of at least one of the icons when the complexity is equal to or more than a predetermined complexity threshold value.

(Supplementary Note 8)

The communication system according to supplementary note 7, wherein the complexity calculation unit
calculates the complexity by using a parameter coefficient determined for each parameter, and
updates, in response to an input of a display position of the icon by a user, the parameter coefficient, based on the display position related to the input.

(Supplementary Note 9)

A communication management method including:
a stage of calculating, for each of a plurality of communication devices on a network, a display position of an icon that identifies the communication device in a display unit, based on positional information about the communication device;
a stage of calculating complexity of a topology between a plurality of the icons, based on a display position of the plurality of the icons; and
a stage of correcting a display position of at least one of the icons when the complexity is equal to or more than a predetermined complexity threshold value.

(Supplementary Note 10)

A communication management program for causing a computer to execute:
a stage of calculating, for each of a plurality of communication devices on a network, a display position of an icon that identifies the communication device in a display unit, based on positional information about the communication device;
a stage of calculating complexity of a topology between a plurality of the icons, based on a display position of the plurality of the icons; and
a stage of correcting a display position of at least one of the icons when the complexity is equal to or more than a predetermined complexity threshold value.

What is claimed is:

1. A communication management system for a plurality of communication devices on a network, the communication management system comprising:
at least one memory configured to store instructions; and
at least one processor configured to execute the instructions to:
display icons identifiably representing the communication devices;
display one or more edges connecting the icons of the communication devices that have a connection relationship with one another;
calculate, for each communication device, a display position of the icon that identifiably represents the communication device, based on positional information regarding the communication device within the network;
based on the display position of the icon for each communication device, determine a first number of the icons that overlap any other icon, a second number of the edges that cross any other edge, and a third number of the edges that overlap any icon;
calculate a complexity of a display topology of the icons and the edges, based on the first number, the second number, and the third number; and
in response to the complexity being greater than a threshold, change the display position of each of at least one of the icons to reduce the complexity to be less than the threshold-.

2. The communication management system according to claim 1, wherein the at least one processor is configured to execute the instructions to further:
calculate the complexity by using a first coefficient for the first number, a second coefficient for the second number, and a third coefficient for the third number; and
update, in response to user input that changes the display position of one of the icons, the first, second, and third coefficients, based on the changed display position.

3. The communication management system according to claim 1, wherein the at least one processor is configured to execute the instructions to further, for each communication device:
calculates a complexity of a sub-display topology including the icon that identifiably represents the communication device and at least one other icon, based on the display position of the icon that identifiably represents the communication device and the display position of the icon of each of the at least one other icon; and
determines whether to correct the display position of the icon that identifiably represents the communication device, based on the complexity of the sub-display topology.

4. The communication management system according to claim 1, wherein the at least one processor is configured to execute the instructions to, for each of one or more units of the network:
calculate a complexity of a sub-display topology including the communication devices in the unit, based on the display position of the icon of each communication device in the unit; and
determine whether to correct the display position of the icon of any communication device in the unit, based on the complexity of the sub-display topology in the unit.

5. The communication management system according to claim 1, wherein, for each communication device, the at least one processor is configured to execute the instruction to calculate the display position of the icon that identifiably represents the communication device such that a distance between a position of displayed positional information regarding the communication device and the display position of the icon that identifiably represents the communication device is less than a predetermined distance threshold value.

6. A communication management method for a plurality of communication devices on a network, the communication management method comprising:
- displaying, by a processor, icons identifiably representing the communication devices;
- displaying, by the processor, one or more edges connecting the icons of the communication devices that have a connection relationship with one another;
- calculating, by the processor and for each communication device, a display position of the icon that identifiably represents the communication device, based on positional information regarding the communication device within the network;
- based on the display position of the icon for each communication device, determining, by the processor, a first number of the icons that overlap any other icon, a second number of the edges that cross any other edge, and a third number of the edges that overlap any icon;
- calculating, by the processor, a complexity of a display topology of the icons and the edges, based on the first number, the second number, and the third number; and
- in response to the complexity being greater than a threshold, changing, by the processor the display position of each of at least one of the icons to reduce the complexity to be less than the threshold.

7. The communication management method according to claim 6, further comprising:
- calculating, by the processor, the complexity by using a first coefficient for the first number, a second coefficient for the second number, and a third coefficient for the third number; and
- in response to user input that changes the display position of one of the icons, updating, by the processor, the first, second, and third coefficients, based on the changed display position.

8. A non-transitory computer-readable storage medium storing a program executable by a processor to perform management for a plurality of communication devices on a network by:
- displaying icons identifiably representing the communication devices;
- displaying one or more edges connecting the icons of the communication devices that have a connection relationship with one another;
- calculating, for each communication device, a display position of the icon that identifiably represents the communication device, based on positional information regarding the communication device within the network;
- based on the display position of the icon for each communication device, determining a first number of the icons that overlap any other icon, a second number of the edges that cross any other edge, and a third number of the edges that overlap any icon;
- calculating, a complexity of a display topology of the icons and the edges, based on the first number, the second number, and the third number; and
- in response to the complexity being greater than a threshold, changing the display position of each of at least one of the icons to reduce the complexity to be less than the threshold.

9. The non-transitory computer-readable storage medium according to claim 8, wherein the program is executable by the processor to perform the management by further:
- calculating the complexity by using a first coefficient for the first number, a second coefficient for the second number, and a third coefficient for the third number; and
- in response to user input that changes the display position of one of the icons, updating the first, second, and third coefficients, based on the changed display position.

* * * * *